June 18, 1963  K. NURMSE  3,094,296
FISHING REEL WITH RECIPROCABLE SPOOL
Filed Oct. 19, 1959
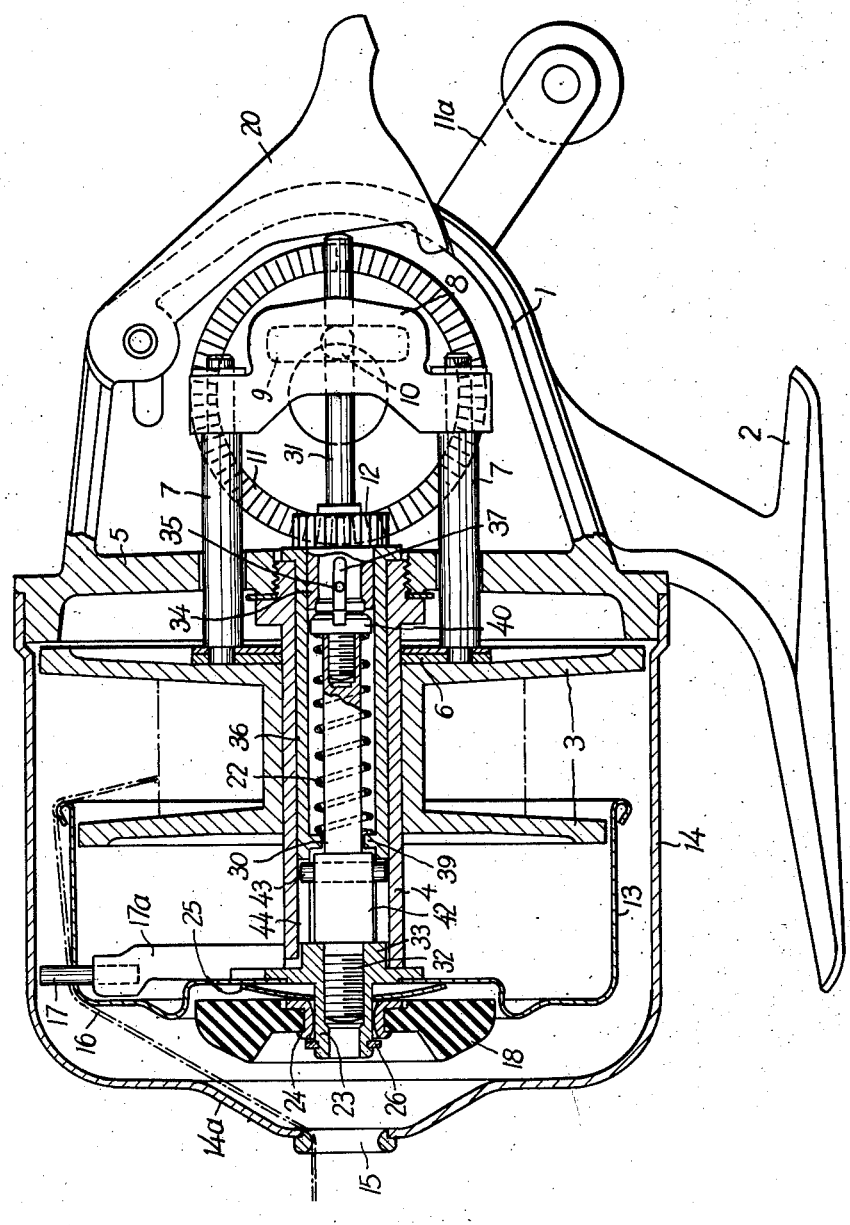
INVENTOR.
Karl Nurmse,
BY
Pierce, Scheffler & Parker
his Attorneys United States Patent Office 3,094,296
Patented June 18, 1963

3,094,296
FISHING REEL WITH RECIPROCABLE SPOOL
Karl Nurmse, Svangsta, Sweden, assignor to Aktiebolaget Urfabriken, Svangsta, Sweden, a corporation of Sweden
Filed Oct. 19, 1959, Ser. No. 847,310
Claims priority, application Sweden Oct. 24, 1958
6 Claims. (Cl. 242—84.21)

This invention relates to a reel in which a line is peeled off axially with respect to a line spool and wherein a spooling member disposed coaxially with respect to the line spool is rotatable by means of a crank-operable drive shaft and axially displaceable to a line-arresting forward position by means of an arresting rod which is displaceable by means of a thumb piece against the action of a return spring. The object of the invention is to provide an improved reel of the type indicated in which the return spring has a well protected position and the arresting rod is more durable and easier to manufacture than in conventional constructions of this type. In its broadest aspect, the invention is characterized in that the return spring is disposed within the tubular drive shaft and bears on a radial internal abutment in said shaft. In a preferred embodiment of the invention, the arresting rod has a collar which bears on the return spring and is provided on an individual part of the rod, which individual part is relatively non-rotatably connected to and supports the spooling member and is longitudinally displaceable but non-rotatable relative to the tubular drive shaft, whereby to transmit movement of the drive shaft to the spooling member.

The invention is described more closely hereinbelow with reference to an embodiment illustrated in the annexed drawing which shows a central longitudinal section of the reel.

Referring to the drawing, reference numeral 1 denotes a case which is rigidly secured to a tang 2 by means of which the reel can be attached to a fishing rod. Numeral 3 denotes a spool for the fishing line. The line spool is longitudinally displaceably mounted on a guide sleeve 4 which is screwed into a front wall 5 of the case 1. By means of a bayonet-like locking device the line spool 3 is connected to a plate 6 which is secured to spool actuating rods or links 7 guided in openings in the wall 5. Secured to the rods 7 is a yoke 8 which is displaceable by means of an eccentric pin 10 engaging a transverse groove 9 in one side face of the yoke. The bottom of groove 9 is spaced outwardly from the aperture for rod 31. This pin 10 is connected to gear 11 which can be rotated by means of a crank 11a. It will be seen that when the crank is turned a reciprocating movement will be imparted to the line spool 3.

Mounted in the stationary guide sleeve 4 is a tubular drive shaft 36 adapted to be rotated by means of a gear 12 which meshes with the larger gear 11. A cup-shaped spooling member 13 is relatively non-rotatably connected with the drive shaft. The spooling member and the line spool 3 are surrounded by a cover 14 having a central opening 15 forming a guide for the fishing line which is indicated by a chain-dotted line 16. Associated with the spooling member is a pick-up pin 17 which when the crank is turned to rotate the spooling member 13 spools the line around the reciprocating line spool 3.

The pick-up pin 17 is secured to a carrier 17a which is slidable radially along the end wall of the spooling member 13 and biased inwardly to retracted position by means of a spring, not shown. The mechanism for actuating the carrier 17a does not form part of the invention and may be of any suitably conventional type including a cam surface at the front end of the guide sleeve 4 to keep the members 17 and 17a in the projected position against the action of the above named spring when the line is to be wound onto the spool 3.

During the outward flow of the line the pick-up pin 17 is retracted so that the line can be peeled off the spool and pass between the cover 14 and the spooling member 13 which is stationary at this time. To arrest the line at the end of the outward flow, the spooling member 13 is associated with an arresting member 18 which together with the spooling member is displaceable toward the cover 14 such that the line can be snubbed between the cover 14 and the arresting member. The members 13, 18 are moved forward by means of a thumb piece 20 which is pivotally mounted in the case 1 and acts upon an arresting rod 30, 31 against the action of a return spring 22. The rod 31 extends through an opening in the yoke 8.

In the embodiment exemplified, the arresting member 18 is disc-shaped and freely mounted on a central hub 23 of the spooling member 13. The member 18 suitably consists of a resilient material, such as rubber, and has a central metallic core 24. The core or the hub has an arcuate or spherical bearing surface so that the arresting member can slightly rock as it comes into contact with the line. Consequently, the arresting member will not only come into contact with the line, but also with the diametrically opposite side of the cover 14. At the rear of the arresting member there is provided a spring 25, such as a bowed washer, which maintains the arresting member in contact with an abutment 26 on the hub 23.

Due to the fact that the arresting member 18 is movably mounted the line will be arrested very smoothly without risk of wear at the end of the outward flow even if the thumb piece is quickly and forcibly depressed. The fact that the arresting member consists of a resilient material or is covered with a resilient material also adds to this effect.

Preferably, the arresting member has a conical active face adapted to engage a correspondingly conical portion 14a of the reel cover.

The arresting rod 30, 31 consists of two parts, namely, a front rod 30 which at 32 is screwed into a threaded part 33 of the hub of the spooling member 13, and a rear push rod 31, which is longitudinally displaceable through, but relatively non-rotatable with respect to, the gear 12 and an elongated hub 34 integral with the gear 12. By means of a cross-pin 35 the hub 34 is connected with the tubular drive shaft 36 which consequently can be rotated by means of the crank to wind the fishing line onto the spool 3. Within the hub 34, the push rod 31 has an open slot 37 for the pin 35. The return spring 22 is inserted between an inner radial abutment 39 in the tubular drive shaft 36 and a collar 40 on the rod 30. The collar 40 is formed by the head of a screw which is screwed into the rear end of the rod 30. The spring 22 forces the screw head against the inner end of the push rod 31. When the push rod is forced inwards by means of the thumb piece 20, the rod 30 as well as the spooling member 13 and the arresting member 18 will be moved to the arresting position against the action of the spring 22.

To transmit the rotation of the tubular drive shaft 36 to the spooling member 13, a pin 43 extending through an enlarged portion 42 of the rod 30 is slidable in longitudinal grooves 44 at the end of the tubular drive shaft.

Constructions are known in which a return spring for the arresting rod is disposed within the case 1 and in which the arresting rod is a single piece. Due to the fact that in accordance with this invention the return spring is disposed within the tubular drive shaft 36, the spring is well protected and the arresting rod can be made in two or more separate parts. These parts are relatively short and consequently more durable and easier to manufacture than a single and comparatively long rod. Further, the location of the spring 22 within the shaft 36 permits the provision of the slide device 7, 8 for reciprocating the line spool 3 by means of an eccentric pin 10. Previously, this has been practically impossible if the return spring is disposed in the narrow space within the case 1. In a construction according to the invention, the separate push rod 31 can be guided through the yoke 8 which can reciprocate in close vicinity of the gears 11 and 12 so that there would be no space available at this place for a return spring.

It should be pointed out that the arresting rod also serves as a releasing member for the pick-up pin 17 or similar pick-up member.

What I claim is:

1. A reel comprising a spool for a line, a spooling member disposed coaxially with respect to the line spool and rotatable to wind line onto said spool, a crank, a tubular drive shaft rotatable by said crank for rotating the spooling member, an arresting rod for displacing the spooling member axially to a line-arresting position, resilient means biasing said rod to non-arresting position, a thumb piece engaging said rod for displacing said rod against the action of said resilient means, said rod comprising an individual part, said spooling member being mounted on said individual part, said individual part and said tubular drive shaft having complementary mating surfaces, said surfaces engaging one another to rotatably drivingly connect said tubular drive shaft and said individual part and permitting relative axial movement therebetween and said spool being mounted for axial movement in combination with means connected to said spool to reciprocate it axially, said means including a yoke, an eccentric abutment on said crank mounted to engage and reciprocate said yoke, and said yoke having formed therein an opening through which said arresting rod extends whereby said spooling member may be rotated to wind line and axially displaced to a line arresting position and said spool reciprocated during the winding by said spooling member.

2. A fishing reel comprising a frame, a sleeve non-rotatably mounted in said frame, a line spool axially movable on said sleeve, a tubular drive shaft rotatably mounted in said stationary sleeve, a hand operable crank mounted on said frame, a gear mechanism interconnecting said crank and said tubular drive shaft so that said crank is operative to rotate said tubular drive shaft, said gear mechanism including a ring gear whose axis is perpendicular to that of said tubular drive shaft, and a pinion on said tubular drive shaft and meshing with said ring gear, an arrestor rod projecting through said pinion and being axially movable relatively to said tubular drive shaft, said rod slidably and non-rotatably engaging said tubular drive shaft, a spooling member fixed to the end of said rod distant from said pinion, said spooling member being operative, upon rotation of said crank, to wind line on to said spool, link means slidably mounted in said frame and connected to said spool and reciprocable parallel to said stationary sleeve to reciprocate said spool on said stationary sleeve, a yoke slidably mounted on the end of said rod that projects through said pinion and fixed to said link means mounted in said frame, an eccentric projecting from said ring gear rotatable by said crank to engage said yoke whereby rotation of said crank reciprocates said yoke and said spool, a cover fixed to said frame and enclosing said spool and spooling member, an arrestor member fixed to said spooling member and operative, upon axial movement of said arrestor rod, to engage said cover to clamp the line, and a compression spring housed in said tubular drive shaft and operative to bias said rod to move said arrestor member away from said cover.

3. A fishing reel comprising a frame, a sleeve non-rotatably mounted in said frame, a line spool axially movable on but non-rotatable relatively to said sleeve, a tubular drive shaft rotatably mounted in said stationary sleeve, a hand operable crank mounted on said frame, a gear mechanism interconnecting said crank and said drive shaft so that said crank is operative to rotate said drive shaft, said gear mechanism including a ring gear whose axis is perpendicular to that of said tubular drive shaft, and a pinion on said tubular drive shaft and meshing with said ring gear, an arrestor rod projecting through said pinion and being axially movable relatively to said tubular drive shaft, said rod being non-rotatable relatively to said tubular drive shaft, a spooling member fixed to the end of said rod distant from said pinion, said spooling member being operative, upon rotation of said crank to wind line on to said spool, link means connected to said spool and slidably mounted in said frame and spaced from said arrestor rod and reciprocable parallel to said stationary sleeve to reciprocate said spool on said stationary sleeve, a yoke slidably mounted on the end of said rod that projects through said pinion and fixed to said link means slidably mounted in said frame, and an eccentric projecting from said ring gear to engage said yoke whereby rotation of said crank reciprocates said yoke and said spool.

4. A fishing reel comprising a frame, a non-rotatable sleeve mounted on said frame, a line spool axially movable on said sleeve, a line winding member, a tubular drive shaft connected to said member and rotatably mounted in said stationary sleeve, a hand operable crank, a gear mechanism interconnecting said crank and said tubular drive shaft so that said crank is operative to rotate said tubular drive shaft to wind line on to said spool, said gear mechanism including a ring gear whose axis is perpendicular to that of said tubular drive shaft, and a pinion on said tubular drive shaft, an arrestor rod projecting through said pinion and being axially movable relatively to said tubular drive shaft, a pair of links, one on each side of said arrestor rod, reciprocable parallel to said stationary sleeve and connected to said spool to reciprocate said spool on said stationary sleeve, a yoke slidably mounted on the end of said arrestor rod that projects through said pinion and fixed to said links which are reciprocable parallel to said stationary sleeve, an eccentric projecting from said ring gear to engage said yoke whereby rotation of said crank reciprocates said yoke and said spool, a cover fixed to said frame and enclosing said spool, an arrestor member fixed to said arrestor rod and operative, upon axial movement of said arrestor rod, to engage said cover to clamp the line, and a compression spring housed in said tubular drive shaft and operative to bias said arrestor rod to move said arrestor member away from said cover.

5. A fishing reel comprising a frame, a sleeve non-rotatably mounted in said frame, a spool mounted on said sleeve, a rotatable spooling member operative to wind line on to said spool, a drive mechanism for rotating said spooling member, a cover enclosing said spool and spooling member and having an aperture through which the line extends, an arrestor member fixed to said spooling member and movable axially relatively to said sleeve to engage said cover to clamp the line between itself and the cover, an arrestor rod for moving said arrestor member, said rod being formed in two parts, a first part projecting through the end of said fixed sleeve opposite to that of said arrestor member for selective engagement and a second part fixed to said arrestor member and spooling member, said drive mechanism including a manual crank, a tubular drive shaft rotatable by said crank within said fixed sleeve, said tubular drive shaft being restrained against axial movement relatively to said fixed sleeve and having an axial slot which is engaged by a projection on said second part of said rod whereby rotation of said tubular drive shaft rotates said second part of said rod, and a compression spring housed in said tubular drive shaft and engaging an abutment on said drive shaft and an abutment on said second part of said rod nearer to said first part of said rod than said abutment in said tubular drive shaft.

6. A fishing reel comprising a frame, a stationary sleeve mounted in said frame, a spool mounted on said sleeve for axial sliding movement, a rotatable spooling member operative to wind line on to said spool, a drive mechanism for rotating said spooling member, a cover enclosing said spool and spooling member and having an aperture through which the line extends, an arrestor member fixed to said spooling member and movable axially away from said sleeve to engage said cover to clamp the line between itself and the cover, an arrestor rod for moving said arrestor member, said rod being formed in two parts, a first part projecting through the end of said fixed sleeve opposite to that of said arrestor member for selective engagement and a second part fixed to said arrestor member and spooling member, said drive mechanism including a manual crank, a tubular drive shaft rotatable by said crank within said fixed sleeve, said tubular drive shaft being restrained against axial movement relatively to said fixed sleeve and having an axial slot which is engaged by a projection on said second part of said rod whereby rotation of said tubular drive shaft rotates said second part of said rod, a compression spring housed in said drive shaft and engaging an abutment in said drive shaft and an abutment on said second part of said rod nearer to said first part of said rod than said abutment in said drive shaft to urge said arrestor member away from said cover, said drive mechanism including a ring gear whose axis is perpendicular to that of said tubular drive shaft, and a pinion on said tubular drive shaft meshing with said ring gear said first part of said rod projecting through said pinion and being axially movable relatively to it, link means engaging said spool and slidably mounted in said frame and spaced from said arrestor rod and reciprocable parallel to said arrestor rod to reciprocate said spool on said stationary sleeve, a yoke slidably mounted on said first part of said rod and fixed to said link means slidably mounted in said frame, an eccentric projecting from said ring gear to engage said yoke whereby rotation of said crank reciprocates said yoke and said spool.

References Cited in the file of this patent
UNITED STATES PATENTS

| | | |
|---|---|---|
| 2,613,468 | Hand | Oct. 14, 1952 |
| 2,644,647 | Denison et al. | July 7, 1953 |
| 2,675,975 | Ferguson | Apr. 20, 1954 |
| 2,719,680 | Dension et al. | Oct. 4, 1955 |
| 2,745,607 | Taggart et al. | May 15, 1956 |
| 2,854,200 | Montgomery | Sept. 30, 1958 |
| 2,862,679 | Denison et al. | Dec. 2, 1958 |